(12) United States Patent
Blasko, III

(10) Patent No.: US 6,833,597 B2
(45) Date of Patent: Dec. 21, 2004

(54) INTEGRATED MEMS POWER-SAVE SWITCH

(75) Inventor: Andrew Stephen Blasko, III, Nazareth, PA (US)

(73) Assignee: Agere Systems Inc., Allentown, PA (US)

(*) Notice: Subject to any disclaimer, the term of this patent is extended or adjusted under 35 U.S.C. 154(b) by 7 days.

(21) Appl. No.: 10/391,800

(22) Filed: Mar. 20, 2003

(65) Prior Publication Data

US 2004/0183148 A1 Sep. 23, 2004

(51) Int. Cl.$^7$ .............................................. H01L 29/82
(52) U.S. Cl. ........................ 257/415; 363/21; 363/50; 363/53; 363/56; 385/18
(58) Field of Search ............................. 363/21, 50, 53, 363/56; 385/18

(56) References Cited

U.S. PATENT DOCUMENTS 5,943,223 A * 8/1999 Pond ........................... 363/53
6,496,612 B1 * 12/2002 Ruan et al. .................. 385/18

* cited by examiner

*Primary Examiner*—David Nelms
*Assistant Examiner*—Mai-Huong Tran

(57) ABSTRACT

An integrated circuit (IC) chip provided with a 'power-save' switch, including MEMS (Micro-Electro-Mechanical Systems) switches in each power and ground ring, to be used to open the circuit and eliminate power drain. The MEMS switches preferably include a cantilevered beam deflected by an electrostatic charge. When the equipment of which the IC forms a part is put on standby, it enters a low-power mode in which the 'power-save' switch in each IC is actuated by a small control circuit that remains powered up. The MEMS switches are preferably latched into position at least when in the open position, for example by using an permanent magnet, so that no power is consumed by the open switches. The invention is applicable to chips used in wireless mobile terminals, where power consumption is critical, and in any application where it is necessary to enter a standby mode between uses.

14 Claims, 3 Drawing Sheets

INTEGRATED MEMS POWER-SAVE SWITCH

BACKGROUND OF THE INVENTION

1. Field of the Invention

This invention relates to reducing power consumption of integrated circuits. More particularly, the invention relates to reducing power consumption in MEMS devices, particularly power loss caused by transistor current leakage even while the MEMS-based device is in a low-power or standby mode.

2. Background of Related Art

Wireless mobile terminals continue to decrease in overall size with advances in integrated circuit fabrication and in circuit design. At the same time, power output has increased, with an attendant increase in power consumption. The reduction in size limits the size of battery that can reasonably be incorporated without adversely affecting the size of the unit. It is therefore becoming more critical to reduce unnecessary power consumption as the size of the units decreases.

Low-power or standby modes are commonly provided to reduce power consumption when no call is in progress. However, the extent to which power consumption can be reduced in a low-power or standby mode is limited by the presence of unwanted leakage currents. Whilst proper design of the active devices can reduce leakage currents, they cannot be eliminated entirely in this way. Moreover, as integrated circuits become smaller, the design problem of reducing leakage currents is likely to become more difficult.

FIG. 3 illustrates a conventional integrated circuit capable of operating in a standby or low-power mode.

In particular, as shown in FIG. 3, an integrated circuit 300 includes an operating circuit portion 301, and a low power control circuit portion 302. The low power control circuit 302 places the operating circuit 301 into a low power or standby mode as appropriate for the particular application. The low power control circuit 302 also monitors activity for instructions to awake the operating circuit 301 from its low power state.

When the conventional operating circuit 301 is placed into a quiescent or low power state, various transistor switches 310 are opened to electrically separate the operating circuit 301 from one or more power sources.

As wireless mobile terminals become smaller and more powerful, the amount of energy used during low-power or standby mode becomes more critical. Previous attempts to overcome this problem have involved setting each transistor or active device into a mode in which it consumes the least power. However, the reality is that all transistors have some amount of leakage current even when turned off, no matter how minute. As the number of transistors in integrated circuits increase with added miniaturization and complexity, more transistors are required, adding to an overall power leakage. Moreover, it becomes increasingly difficult to provide the required hardware registers and to develop appropriate controlling software to set all the necessary transistors into a low-power state, and to awake the same when coming out of the low power mode.

Clearly, much of the foregoing applies not only to mobile wireless terminals, but to a greater or lesser extent to battery operated electronic equipment of any kind, and particularly to equipment employing complex integrated circuits, having components that consume large amounts of power, such as for transmitting, and having a need to standby in readiness between uses.

There is a need for reducing even further both the complexity of low-power controlling requirements and the leakage of transistors within an integrated circuit during low power (e.g., standby) modes.

SUMMARY OF THE INVENTION

In accordance with the principles of the present invention, an integrated circuit (IC) chip is provided with a 'power-save' switch, including MEMS (Micro-Electro-Mechanical Systems) switches in each power and ground ring, to be used to open the circuit and eliminate power drain.

The MEMS switches are preferably latched in position by, for example, a permanent magnet, at least when in the open position, so that no power is required to keep the switches open.

When the equipment of which the IC forms a part is put on standby, it enters a low-power mode in which the 'power-save' switch in each IC is actuated by a small control circuit that remains powered up.

The invention is applicable to chips used in wireless mobile terminals, where power consumption is critical and it is necessary to enter a standby mode between uses.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

In accordance with the principles of the present invention, integrated circuit chips are provided with integrated MEMS-technology based mechanical switches in power rings controlled to physically open power circuits during standby or other low power modes, to not only minimize current leakage from the multitude of transistors that would otherwise be switched off, but also to simplify the control structure in a low power mode.

Micro-Electro-Mechanical Systems (MEMS) technology relates to the integration of mechanical elements such as sensors, actuators, and/or switches with more traditional semiconductor electronics on a common silicon substrate using microfabrication technology. While the electronics are fabricated using integrated circuit (IC) process sequences (e.g., CMOS, Bipolar, or BICMOS processes), the micromechanical components are fabricated using compatible "micromachining" processes that selectively etch away parts of the silicon wafer or add new structural layers to form the mechanical and electromechanical devices.

Using MEMS technology, devices such as MEMS-based storage devices have been developed to provide many advantages, such as providing small physical size, good portability, low power and the potential to integrate processing within the same substrate. For portable applications such as notebook PCs, PDAs, video camcorders and biomedical monitoring, robust lower power consuming devices are provided allowing rapid rotation of the device and/or shock absorption. MEMS devices have a high reliability in such situations by employing multiple sleds or a RAID scheme on a single sled, increasing actuator force, decreasing sled mass and increasing spring force to increase the tolerance to shock. Perhaps the most important advantage of a MEMS device comes from the low power physical characteristics provided by a sled, which has much less mass than a disk platter and takes far less power to keep it in motion. Moreover, the MEMS device has a fast transition between active and standby modes, so a standby mode can be efficiently employed to stop sled movement during a period of activity.

Figure 1:
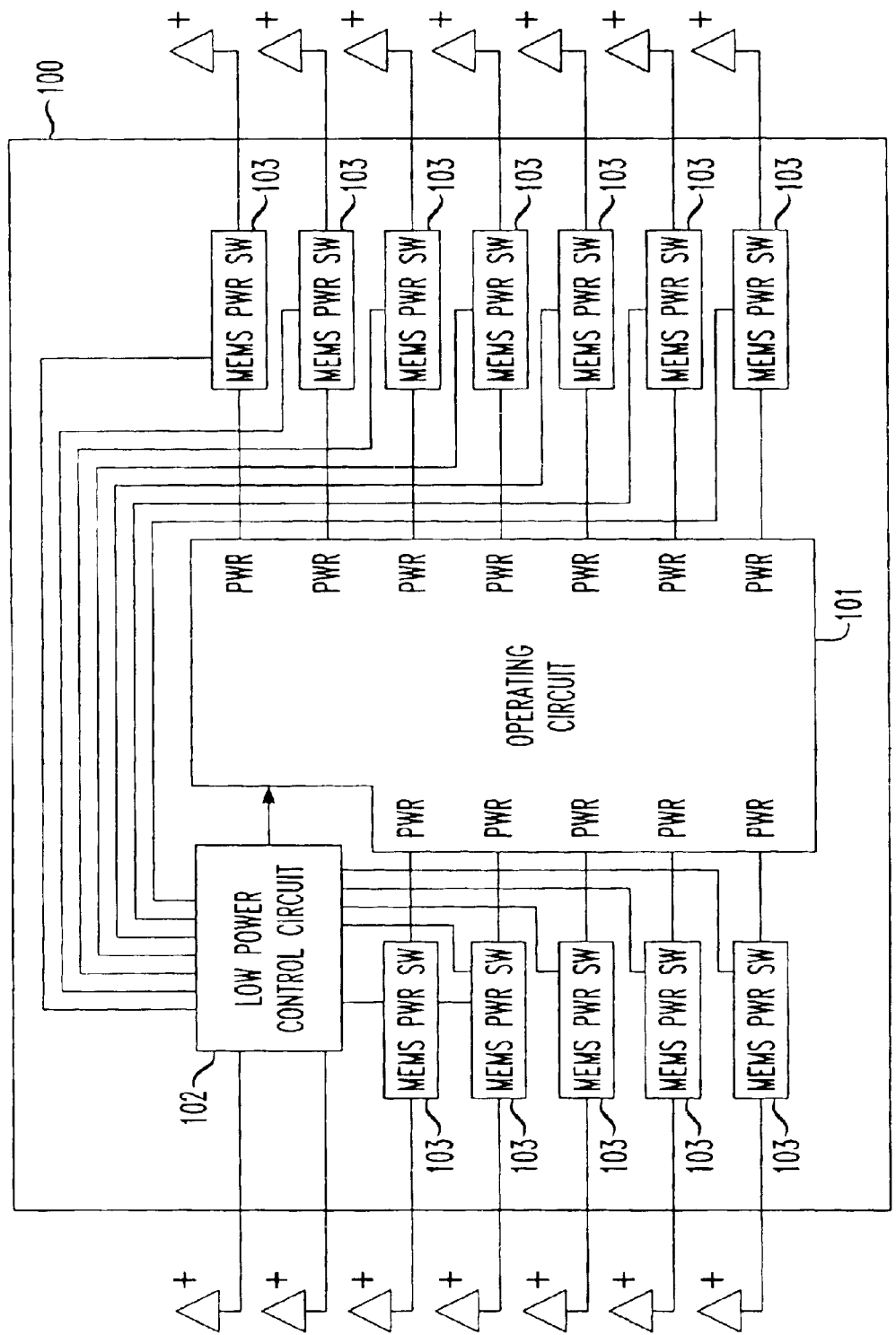
FIG. 1 shows an integrated circuit including a MEMS-technology mechanical switch in power rings including various portions of an operating circuit, in accordance with the principles of the present invention.

FIG. 1 shows an exemplary integrated circuit 100 including MEMS-technology mechanical switches 103 in power rings including various portions of an operating circuit 101, to be switched off and thereby eliminate current leakage entirely while in standby or low power modes, in accordance with the principles of the present invention. The operating circuit 101 may be any appropriate electrical, or electromechanical (i.e., MEMS) circuit that requires a low power mode.

The low power control circuit 102 represents the need for a relatively small amount of circuitry to remain energized even in low power mode to allow control of the low power mode. The low power control circuit 102 can be any otherwise conventional low power mode control circuit (e.g., including registers set by software to initiate or awake from low power mode, etc.), with the exception that instead of (or in addition to) switching appropriate transistors off within the operating circuit 101 during a low power mode, the MEMS-based power switches 103 are also controlled to physically switch to an open position.

When a standby signal is applied to the low power control circuit 102, each of the MEMS-based power switches 103 are operated to an open state, thereby disconnecting power to all or relevant portions of the operating circuit 101. Preferably the MEMS-based power switches 103 maintain their state with a minimal or no amount of electrical energy required (e.g., using magnetic contacts, spring action, etc.).

The MEMS power switches 103 shown in FIG. 1 eliminate current leakage entirely by preventing or opening the circuit of one or more power loops during a standby or low-power mode. Each MEMS power-save switch 103 positively cuts off power to the associated portion of the operating circuit 101 so that no leakage currents can flow.

Preferably, the MEMS-based power switches 103 are switched off or open after appropriate software has safely brought down the internal state of the operating circuit 101, to prevent the inadvertent loss of data when the power is finally positively removed from the operating circuit (or appropriate portions thereof).

MEMS switches are mechanical switches that are fabricated on an IC substrate by micromachining. Like other mechanical switches, they offer a high degree of isolation, but unlike other mechanical switches, MEMS switches can be formed on an IC together with electronic components. The 'on' resistance of MEMS switches is low, typically a few Ohms, and MEMS switches have been realized that can be switched by logic level voltages, for example in the region of 5 volts.

Various types of MEMS switches may be fabricated. For example, capacitive shunt air-bridge switches, cantilevered switches with push-pull actuation, and/or switches employing a mercury microdrop may be implemented. Actuation of MEMS switches is usually, but not exclusively electrostatic.

These discussed MEMS switch technologies are exemplary only: other topologies are certainly possible and will be evident to those of ordinary skill in the art, providing that the MEMS switch is integrated with the operating circuit that it is to reduce power leakage for, in accordance with the principles of the present invention.

In a preferred embodiment of the invention, the MEMS switches employ a cantilever making positive contact, actuated electrostatically and latched either mechanically or by magnets. An example of such a switch is shown in FIG. 2.

Figure 2:
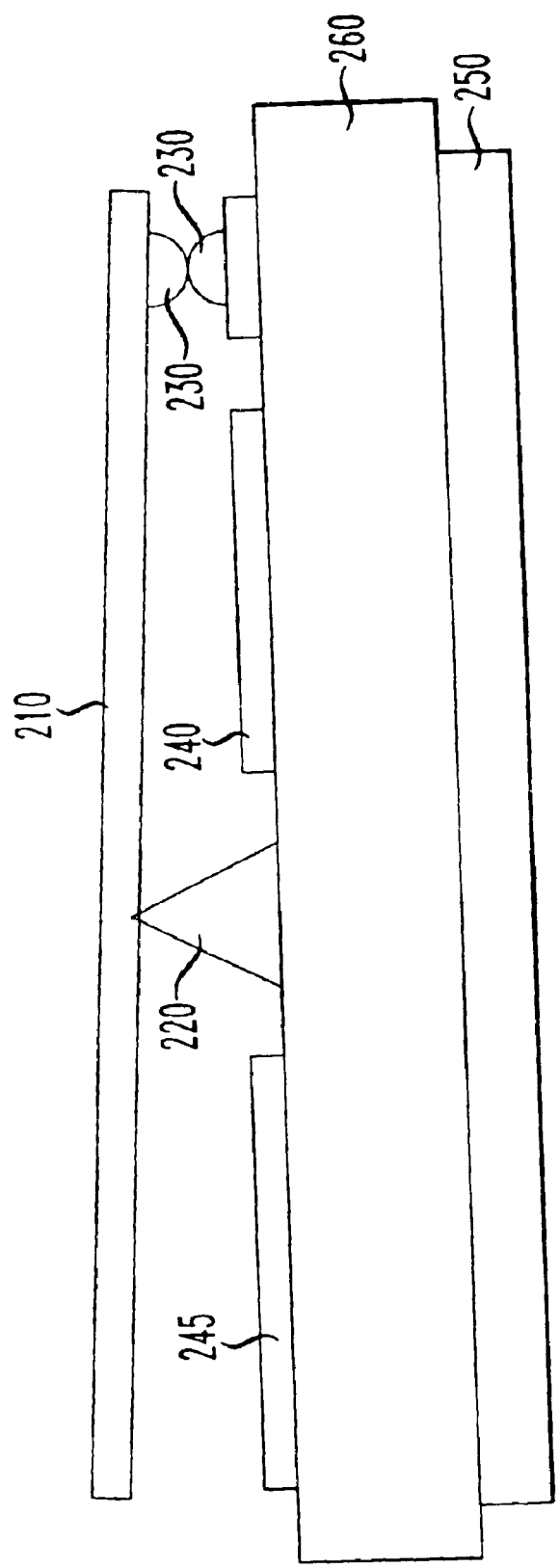
FIG. 2 shows an exemplary MEMS-based mechanical switching device, in accordance with the principles of the present invention.
Figure 3:
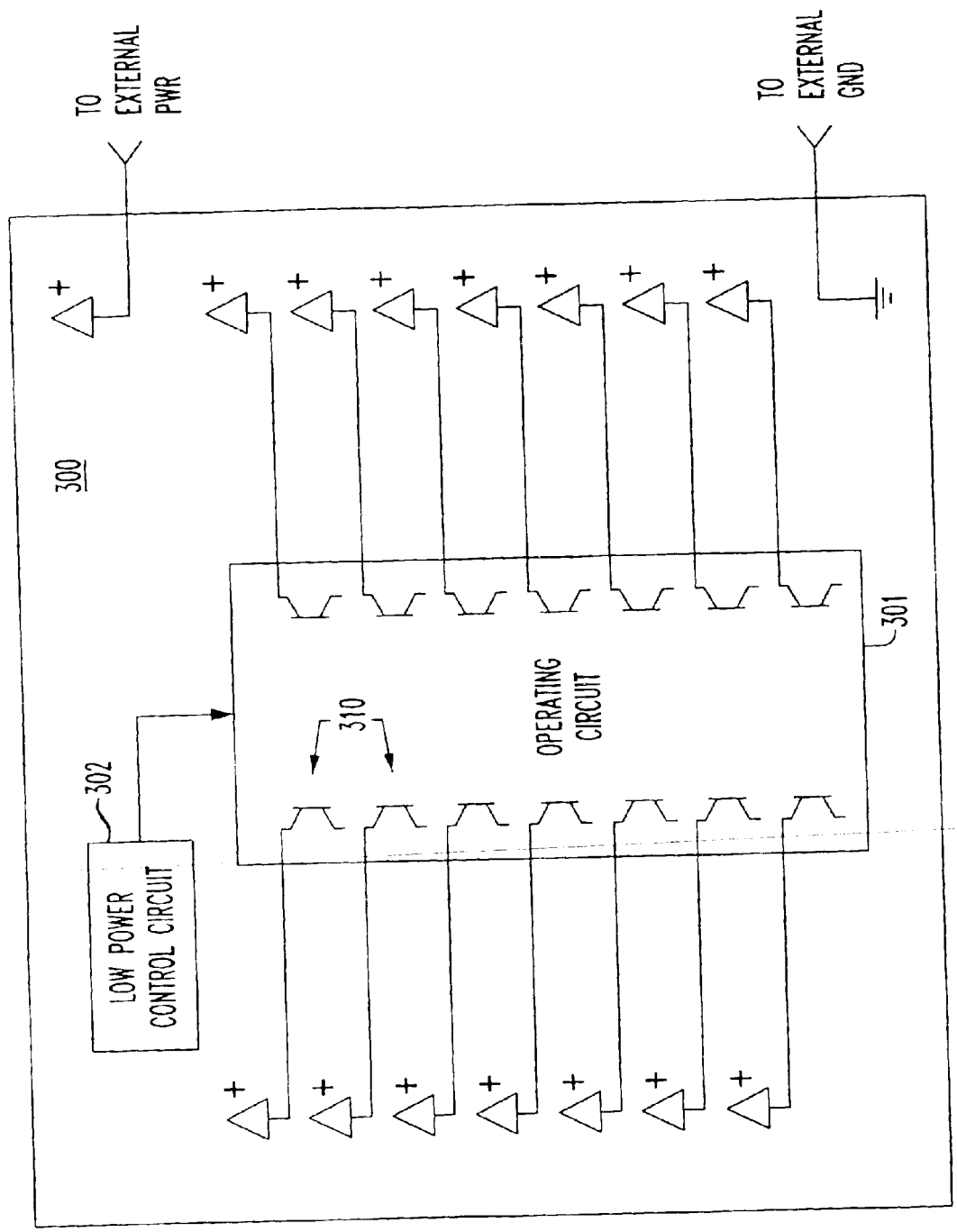
FIG. 3 illustrates a conventional integrated circuit capable of operating in a standby or low-power mode.

More specifically, an example of a magnetically latched MEMS switch is shown in FIG. 2. This includes a substrate 260 having support means 220 upon which a cantilever 210 is supported, and provided with an electrostatic actuators 240 and 245, as well as a permanent magnet 250. Support means 220 may comprise torsion bars. Contacts 230 are provided on the cantilever 210 to bridge a conductor on substrate 260 when the cantilever 210 is in the position shown. In this position cantilever 210 is latched in place by permanent magnet 250.

When electrostatic actuator 240 is energised such as to repel cantilever 210, cantilever 210 tilts on support 220 to open the switch, and is once again latched in it's new position by permanent magnet 250. To re-close the switch, electrostatic actuator 245 is energised to repel cantilever 210, and permanent magnet 250 again latches the switch in the closed position as shown. It is therefore only necessary to apply a charge to electrostatic actuator 240 to open the switch and to electrostatic actuator 245 to close the switch. No current is consumed by electrostatic actuators 240 or 245 to hold the switch in either the open or the closed position, as it is latched in place by permanent magnet 250.

It will be appreciated that many other configurations of micromechanical switch are possible, and that the invention is in no way limited to the type of switch shown in FIG. 2. For example, the switch could be electromagnetically actuated. It is, however, preferable to employ a micromechanical switch that can be latched in at least the open position without drawing a current, so that as far as possible no current drain is associated with the low-power or standby mode. Of course, if the switch is latched in the closed position as well as in the open position, this will also reduce the current drain of the integrated circuit in normal operation. The switch does not have to be latched magnetically, but may instead be latched mechanically, such as by overcenter action, or by any other suitable mechanism.

While the advantages of the invention are most fully realized with complete power removal from the operating circuit 101 from all power rings of the operating circuit including a power level and a ground level, it is envisioned within the scope of the present invention that some circuits within the operating circuit 101 may remain powered (thus not requiring a MEMS-based power switch 103 for that portion that remains powered).

While the invention has been described with reference to the exemplary embodiments thereof, those skilled in the art will be able to make various modifications to the described embodiments of the invention without departing from the true spirit and scope of the invention.

What is claimed is:

1. A silicon substrate, comprising:

a plurality of integrated electronic components; and a MEMS mechanical switch integrated in said silicon substrate together with said plurality of integrated electronic components, said mechanical switch being wired to open a power loop in at least one of said plurality of integrated electronic components to enter a low power mode.

2. The silicon substrate according to claim 1, further comprising:

a control circuit to automatically physically open said mechanical switch when said at least one of said plurality of integrated electronic components enters said low power mode, and to automatically physically close said mechanical switch when said at least one of said plurality of integrated electronic components enters a full power operating mode.

3. An integrated circuit provided with a power saving device, said integrated circuit comprising:

an operating circuit; and a plurality of power terminal connectors configured to be connected to said operating circuit;

wherein said power saving device is configured to mechanically connect power to at least one of said power terminal connectors when said integrated circuit is in an operating mode;

said power saving device being configured to mechanically disconnect power from said at least one of said power terminal connectors when said integrated circuit is in a standby mode; and said power saving device comprising at least one micromechanical switch interposed between said at least one of said power terminal connectors and said operating circuit.

4. The integrated circuit according to claim 3, further comprising:

a control circuit responsive to a standby signal, said control circuit being configured to open said at least one micromechanical switch when said standby signal is present.

5. The integrated circuit according to claim 3, wherein:

said at least one micromechanical switch is configured to be actuated electrostatically.

6. The integrated circuit according to claim 3, wherein said microelectromechanical switch comprises:

a cantilevered beam; and a conductive pad for contact with an end of said cantilevered beam.

7. The integrated circuit according to claim 6, wherein said at least one microelectromechanical switch further comprises:

a first contact;

a second contact opposing said first contact; and latching means to hold said microelectromechanical switch in at least a position where said first contact does not electrically connect with said second contact.

8. The integrated circuit according to claim 7, wherein said latching means comprises:

a permanent magnet.

9. A power saving device comprising:

at least one microelectromechanical switch interposed between at least one power terminal connector and an operating circuit receiving power from said at least one power terminal connector;

wherein said power saving device is configured to mechanically connect said at least one power terminal connector to said operating circuit to permit an operating mode of said power saving device; and said power saving device being configured to mechanically disconnect said at least one power terminal connector from said operating circuit in a low power mode of said power saving device.

10. The power saving device according to claim 9, further comprising:

a control circuit responsive to a standby signal, said control circuit being configured to open said at least one microelectromechanical switch when said standby signal is present.

11. The power saving device according to claim 9, wherein:

said at least one microelectromechanical switch is actuated using electrostatic energy.

12. The power saving device according to claim 9, wherein said microelectromechanical switch comprises a cantilevered beam.

13. The power saving device according to claim 9, wherein said at least one micromechanical switch further comprises:

a first contact;

a second contact opposing said first contact; and latching means to hold said microelectromechanical switch in at least a position where said first contact does not connect with said second contact.

14. The power saving device according to claim 13, wherein said latching means comprises:

a permanent magnet.

* * * * *